United States Patent [19]

Chen et al.

[11] Patent Number: 5,652,681
[45] Date of Patent: Jul. 29, 1997

[54] GRISM (GRATING-PRISM COMBINATION)

[75] Inventors: Chungte W. Chen, Irvine; Ernest W. Gossett, Glendora, both of Calif.

[73] Assignee: Hughes Electronics, Los Angeles, Calif.

[21] Appl. No.: 584,991

[22] Filed: Jan. 11, 1996

Related U.S. Application Data

[63] Continuation of Ser. No. 310,014, Sep. 21, 1994, abandoned, which is a continuation of Ser. No. 993,344, Dec. 18, 1992, abandoned.

[51] Int. Cl.$^6$ .............................. G02B 5/04; G02B 5/18; G01J 3/28
[52] U.S. Cl. ........................ 359/831; 359/566; 359/570; 359/571; 356/328
[58] Field of Search .............................. 359/566, 569, 359/570–571, 572, 573, 615, 831, 837, 563; 356/328; 369/109, 103

[56] References Cited

U.S. PATENT DOCUMENTS

| | | | |
|---|---|---|---|
| 3,900,263 | 8/1975 | Hall, Jr. | 356/837 |
| 4,338,012 | 7/1982 | Matsumura et al. | 354/200 |
| 4,411,492 | 10/1983 | Bluege | 359/572 |
| 4,475,792 | 10/1984 | Sica | 359/15 |
| 4,973,112 | 11/1990 | Kramer | 359/17 |
| 5,101,458 | 3/1992 | Spaulding et al. | 385/36 |
| 5,112,125 | 5/1992 | Neumann | 356/328 |
| 5,377,288 | 12/1994 | Kashyap et al. | 359/566 |
| 5,420,947 | 5/1995 | Li et al. | 359/569 |

FOREIGN PATENT DOCUMENTS

| | | |
|---|---|---|
| 3041969 | 6/1981 | Germany. |
| 59-057205 | 4/1984 | Japan. |

OTHER PUBLICATIONS

Jpn. UM Appln. Kokai Publication No. 62-155330.
Jpn. Pat. Appln. Kokai Publication No. 55-29824.
M. Neviere, "Echelle grisms: an old challenge to the electro-magnetic theory of gratings now resolved", Applied Optics, vol. 31, No. 4, 1 Feb. 1991, New York, pp. 427–429.
"Novos Geodesy Aeria", Soviet Inventions Illustrated, Section E1, Week 8033, 24 Sep. 1980, Derwent Publications Ltd., London, GB; Class S03, AN H1531C & SU-A-706 711, 30 Dec. 1979 (Abstract).
Wesley A. Traub, "Constant-dispersion grism spectrometer for channeled spectra", Journal Of The Optical Society Of America A, vol. 7, No. 9, Sep. 1990, pp. 1779–1791.

*Primary Examiner*—Scott J. Sugarman
*Assistant Examiner*—Jordan M. Schwartz
*Attorney, Agent, or Firm*—Michael W. Sales; Wanda K. Denson-Low

[57] ABSTRACT

A dispersive optical element called a "grism" (50) which has characteristics of both a prism (56) and a grating (62). The grism (50) consists of a prism (56) with a grating (62) disposed adjacent to one surface of the prism (56). Light passing through the grism (50) is dispersed by both the prism (56) and the grating (62). The grating (62) may be attached to either the first or second surface of the prism (56) or may be simply adjacent to the prism (56). The grism (50) has dispersive characteristics such as resolving power that can be optimized in a very flexible manner by choice of both the grating (62) and prism (56) characteristics. For example, the grating (62) may be used to amplify the angular spread introduced by a prism (56). Also different diffractive orders of the grating (62) may be used simultaneously. The result is a device with a very flexible and improved dynamic range of its resolving power, which is particularly useful in applications such as spectrometers.

12 Claims, 2 Drawing Sheets

GRISM (GRATING-PRISM COMBINATION)

This is a continuation application Ser. No. 08/310,014 filed Sep. 21, 1994 now abandoned which is a continuation of application Ser. No. 07/993,344 filed Dec. 18, 1992, now abandoned

CROSS REFERENCE TO RELATED APPLICATIONS

The present invention contains subject matter which is related to copending U.S. Patent Application entitled "Achromatic and Apochromatic prism element employing prisms and gratings" Serial No. 07/989,417, which is assigned as the same assignee as the present application.

BACKGROUND OF THE INVENTION

1. Technical Field

This invention relates to dispersive optical elements, and particularly to a dispersive optical element having characteristics of both prisms and a gratings.

2. Discussion

Dispersive optical elements have many important uses. Such elements disperse light by deviating the path of light passing through them by an amount that varies with wavelength. Prisms and gratings are the two most widely used dispersive optical elements. Prisms disperse light because their geometry causes light of different wavelengths passing through them to be separated and deviated by different amounts. In diffraction gratings light passing through the grating is diffracted into a series of orders caused by the interference of wavefronts emitted from each slit in the grating. One important usage of dispersive optical elements is the production of spectrometers. Spectrometers have important applications in many fields such as medicine, material sciences, chemistry, and environmental sciences. Spectrometers use dispersive optical elements such as gratings or prisms to permit the analysis of the spectral composition of sampled light.

Grating spectrometers and prism spectrometers each have various advantages and disadvantages. For example, the resolving power of a prism has large variations over wide spectral bands. This is because a prism's resolving power is a function of the prism material dispersion, which varies in a highly non-linear fashion with wavelengths. In most cases, the resolving power for a prism does not match the desired spectral characteristic curve regardless of the choice of materials. For example, where wide spectral coverage is desired the wide variation in the resolving power of a prism spectrometer over this wide spectral band severally limits its usefulness.

Spectrometers utilizing gratings have other disadvantages. In a grating spectrometer the grating can typically be used over only one diffractive order since the optical efficiency in other orders will be very low. This limits the flexibility of the grating. Also, the wide separation of light for different diffractive orders may prevent their detection in a single detector thus limiting their usefulness in many applications. Further, the resolving power of a grating is independent of a wavelength. As a result, the dynamic range of the resolving power is fixed and cannot be adapted to fit a desired spectrometer specification. The dynamic range of the resolving power is the variation in the resolving power with wavelength. For example, it may be desired to have a resolving power of 100 in the wavelength range of 25 to 26 microns, and a resolving power of 1000 in the wavelength range of 5 to 7 microns. In sum, in many applications (such as spectrometers), it is desirable to have a dispersive optical element with a predefined resolving power characteristic curve. It may be desired that the curve be linear, constant or some other defined curve. Whether one chooses prisms or gratings, the flexibility to achieve a desire curve is limited.

Thus, it would be desirable to provide a dispersive optical element that is more flexible in its dispersive characteristics than gratings or prisms. Further, it would be desired to provide a dispersive optical element in which the spectral curve of the resolving power can be predetermined with greater specificity than is possible with either gratings or prisms. Further, it would be desirable to provide such a dispersive optical element that is simple and can be produced at relatively low cost.

SUMMARY OF THE INVENTION

Pursuant to the present invention a dispersive optical element is provided which includes a prism and a grating disposed adjacent to one surface of the prism. Light, after passing through the prism is dispersed further by the grating. The grating may be attached to the prism as in a preferred embodiment of the present invention. Further, the grating may be adjacent to either the first or the second surface of the prism. As a result, the dispersive optical element has dispersive characteristics, such as resolving power, that can be optimized in a very flexible manner by choice of both the grating and prism characteristics. That is, the prism parameters can be determined by the geometry and material chosen, and the grating characteristics can be specified by the number of gratings, the diffractive order and the type of grating used. As a result, the grating may be used to amplify the angular spread introduced by the prism and different diffractive orders may be used simultaneously. This results in a very flexible and improved dynamic range of the resolving power for the diffractive optical element.

BRIEF DESCRIPTION OF THE DRAWINGS

The various advantages of the present invention will become apparent to one skilled in the art by reading the following specification and by reference of the following drawings which.

DESCRIPTION OF THE PREFERRED EMBODIMENT

The present invention is a dispersive optical element utilizing both a grating and a prism. Accordingly, this dispersive optical element will be called a "grism". A grism utilizes the unique properties of both a prism and a grating. These unique properties will be discussed in more detail below. While the preferred embodiment of the present invention utilizes the prism in a spectrometer, it will be appreciated that the other uses may be employed for a grism based on the teachings of the present invention. These include aberration correction, wavefront sampling, multiple beams combining, etc.

Figure 1:
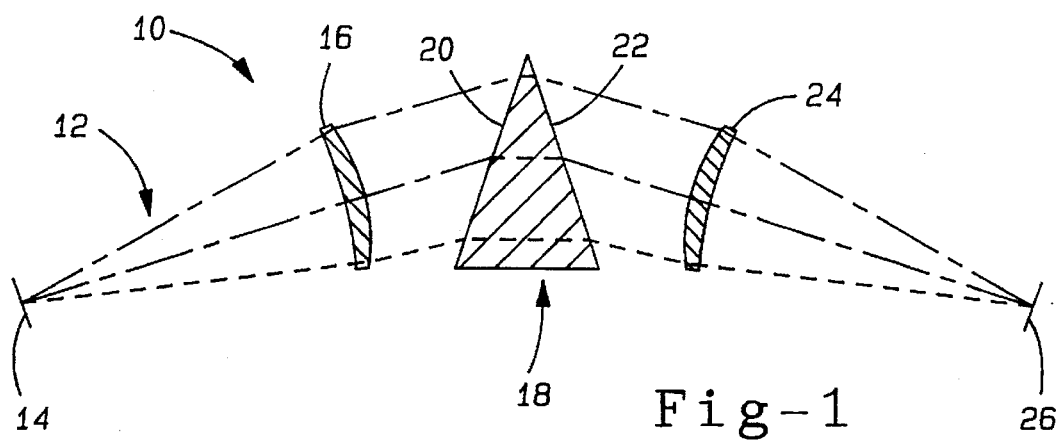
FIG. 1 is a schematic diagram of a prism spectrometer in accordance with the prior art.

Referring now to FIG. 1 a schematic diagram of a classic prism spectrometer 10 is shown. Electromagnetic radiation 12, which will be typically anywhere between infrared and ultra-violet wavelengths, enters the spectrometer through an entrance slit 14. The radiation 12 is collimated by a set of collimating optics 16 and then enters a prism 18 having first 20 and second surfaces 22. The dispersed radiation emitted from the prism 18 then enters a set of imaging optics 24, which focusses the radiation onto a detector 26. The dispersion of the radiation 12 by the prism 18 will cause the radiation to be angularly separated for different wavelengths on the detector 26. The image on the detector 26 will consist of separated chromatic slit images.

The resolving power of a typical prism spectrometer 10 is:

$$\frac{\bar{\lambda}}{\Delta\lambda} = B\frac{dn}{d\lambda} \qquad (1)$$

where $\bar{\lambda}$ and $\Delta\lambda$ are the average wavelength and the resolvable spectral bandwidth, B is the prism base width, n is the index of refraction in the material of the prism, and $dn/d\lambda$ is the dispersion of the prism 18. The index of refraction as a function of wavelength can be approximated as:

$$n = A_1 + A_2\lambda^{-2} + A_3\lambda^{-4} + A_4\lambda^2 + A_5\lambda^4 + \ldots \qquad (2)$$

where $A_1, A_2 \ldots$ are constants which are characteristic of a particular prism material. By differentiating the index formula, the dispersion can be expressed as:

$$\frac{dn}{d\lambda} = \bar{A}_2\lambda^{-3} + \bar{A}_3\lambda^{-5} + \bar{A}_4\lambda + \bar{A}_5\lambda^3 + \ldots \qquad (3)$$

Therefore, as equation 3 illustrates, the dispersion characteristics of a typical prism can be highly nonlinear. As a result, the resolving power of a typical prism spectrometer will also be highly nonlinear with wavelength. Thus, the resolving power of the prism is highly nonlinear and is fixed by the choice of prism material. In sum, the resolving power of a prism is fixed by a choice of material and can not be fine tuned to particular system requirements.

Figure 2:
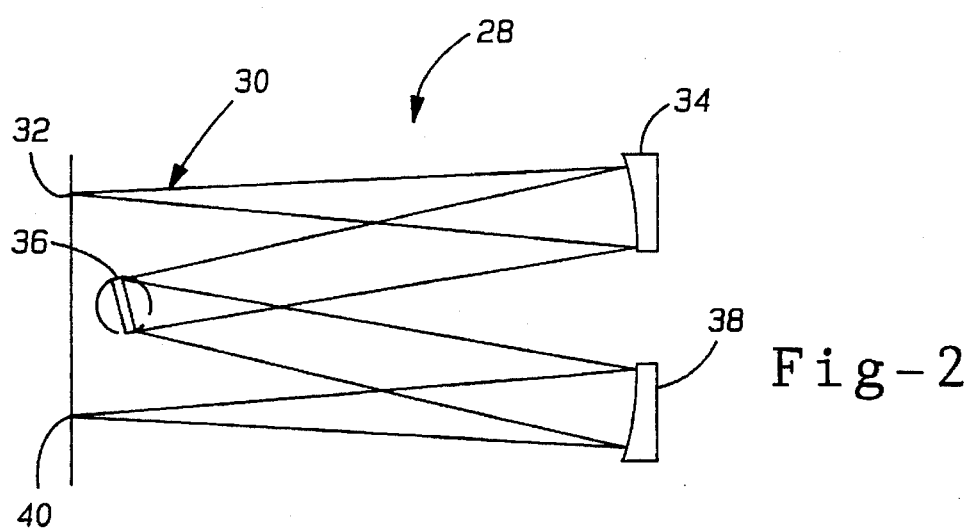
FIG. 2 is a schematic diagram of a grating spectrometer in accordance with the prior art.

A typical grating spectrometer 28 is shown in FIG. 2. This grating spectrometer 28 is a well known configuration commonly known as Czerny-Turner Mounting. Optical radiation 30 enters the spectrometer 28 through an entrance slit 32 and is reflected and collimated by a collimating optics unit 34 which serves the same function as the collimating optic 16 in FIG. 1. The optical radiation 30 is then reflected onto a grating 36, which is a reflection type grating that serves a dispersive function similar to that of prism 18 in FIG. 1. The optical radiation is then reflected by imaging optics 38 which focusses the optical radiation onto a detector (not shown) through a exit slit 40.

The resolving power of the grating spectrometer 28 is p×m, where p is the diffracted order and m is the total number of grating lines in the grating 36. This illustrates that the resolving power of the grating 36 is independent of wavelength.

Figure 3:
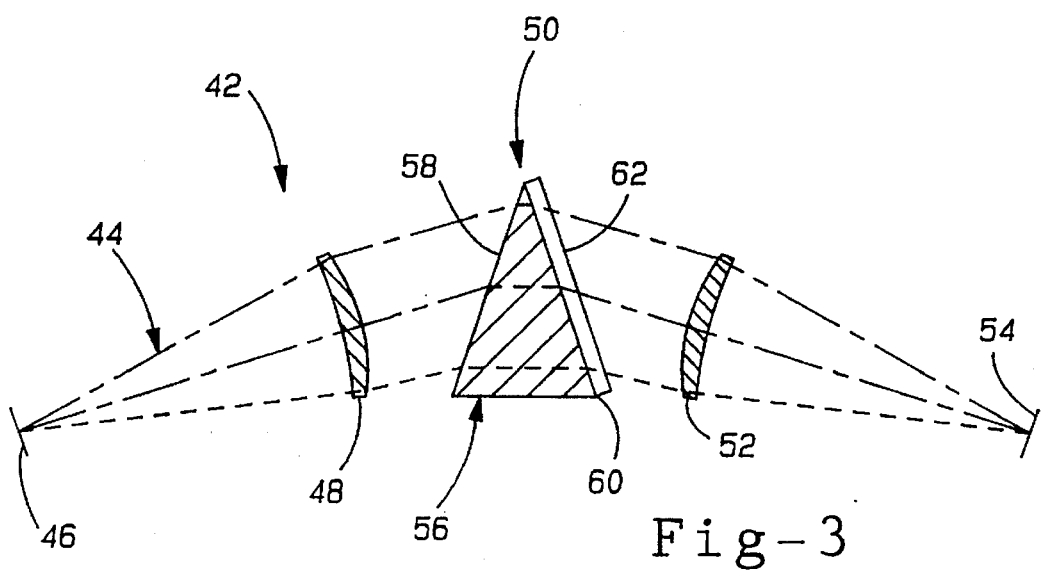
FIG. 3 is a schematic diagram of a grism spectrometer in accordance with a first embodiment of the present invention.

To overcome the above-mentioned deficiencies of both prism and grating spectrometers, the present invention utilizes a "grism", which consists of a single dispersive optical element utilizing both a prism and a grating. FIG. 3 is a schematic diagram of a grism spectrometer 42 in accordance with a first preferred embodiment of the present invention. Optical radiation 44 enters the spectrometer through an entrance slit 46 and is collimated by conventional collimating optics 48. The light then enters the grism 50 where it is dispersed. The optical radiation 44 is then focused by an imaging optics unit 52 into a spectrum on a detector 54.

In more detail, the grism 50 comprises a prism 56 having a first surface 58 and second surface 60. A grating 62 is etched onto the second surface 60 of the prism. It will be appreciated that while the grating 62 is etched onto the second surface 60 in the preferred embodiment, other variations are possible while still achieving the advantages of the present invention. For example, grating 62 may be mounted to the first surface 58 of the prism, or comprise a reflective grating instead of the transmissive grating 62. In the case of reflective grating, for example, the optical radiation 44 may pass through the prism and impinge upon the reflective grating on the second surface of the prism and then pass through the prism again in the opposite direction. In such a configuration the collimating optics could also be used as the imaging optics. Also, in other embodiments, the grating may be attached to the prism by other means, or may comprise a separate grating placed adjacent to the prism and not actually attached. Further it will be appreciated that many different kinds of gratings can be used, such as a blazed grating, binary optics, volume hologram, surface relief hologram, or an absorption grating.

It is important to note that the optical radiation 44 undergoes dispersion in the prism and is further dispersed by the grating 62. Therefore, the combination of a prism and a grating provides more flexibility in creating a resolving power function for meeting specific requirements for various applications. The resolving power of a "grism" is $$\frac{\bar{\lambda}}{\Delta\lambda} = B(\bar{A}_2\lambda^{-3} + \bar{A}_3\lambda^{-5} + \bar{A}_4\lambda + \bar{A}_5\lambda^3 + \ldots) * \sum_{i=1}^{k} P_i m \qquad (4)$$

where B is the prism base width, $\bar{A}_i$'s are the constants used to describe the slope of the index of refraction as a function of wavelength, $P_i$ is the diffractive order of the i'th spectral band of the grating 62, k is the total number of spectral bands involved, and m is the number of lines in the grating 62. In accordance with the present invention, with judicious selection of diffractive order for each spectral band, the dynamic range of the resolving power of the grism can be greatly improved over that of a prism or a grating alone.

In selecting the grism parameters, it should be noted that there are two important parameters associated with a grating: resolving power and diffraction efficiency. The resolving power is controlled by the grating period m and the diffraction order p. The grating efficiency is controlled by the parameters related to the diffraction mechanism. For instance, the diffraction efficiency of a blazed grating is a function of the ratio of the blazed width to the grating period. On the other hand, the diffraction efficiency of a volume hologram is a function of the modulation of the index of refraction.

Figure 4A:
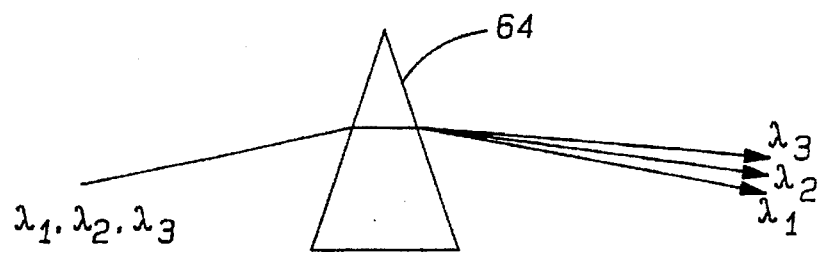
FIG. 4A is a schematic diagram of a prism spectrometer dispersing three wavelength bands.
Figure 4B:
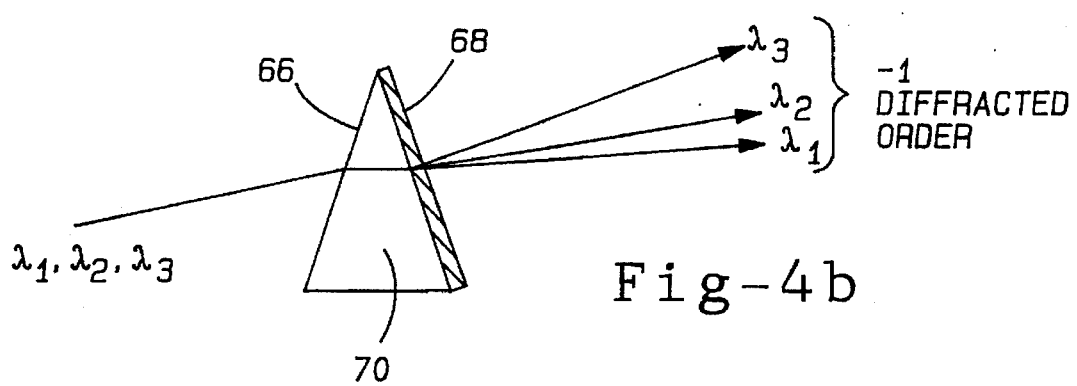
FIG. 4B is an schematic diagram of a equally-diffracted grism spectrometer utilizing the minus one diffractive order of the grating in accordance with a second embodiment of the present invention.
Figure 5:
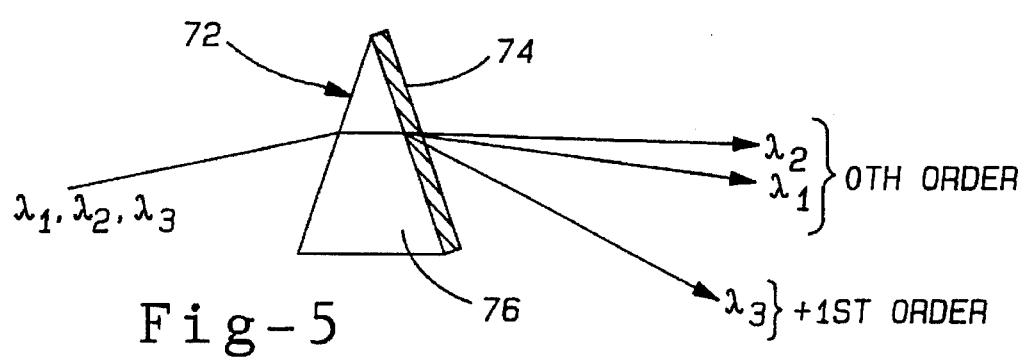
FIG. 5 is a schematic diagram of a partially-diffracted grism spectrometer in accordance with a third embodiment of the present invention.
Figure 6:
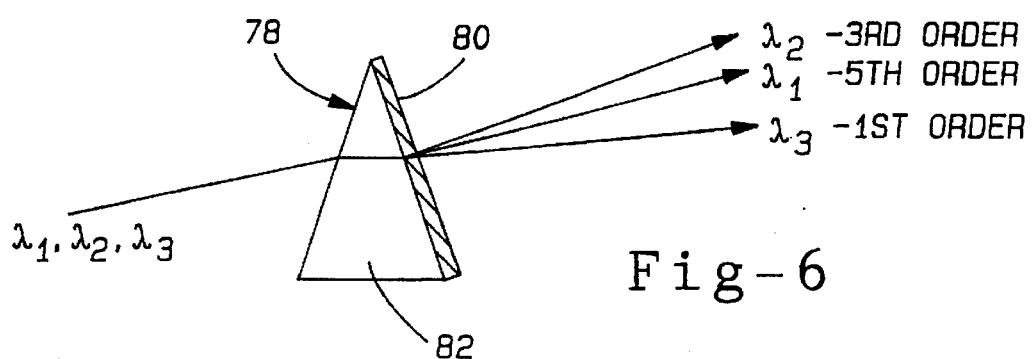
FIG. 6 is a schematic diagram of an unequally-diffracted grism spectrometer in accordance with a fourth embodiment of the present invention.

Among the variations in the basic grism spectrometer 42 of FIG. 3 are three additional embodiments utilizing particular predetermined diffractive orders to achieve different desired spectral characteristics. These three embodiments are shown in FIGS. 4, 5, and 6 are referred to as the equally-diffracted grism, the partially-diffracted grism, and unequally-diffracted grism. FIG. 4A illustrates a conventional prism 64 in which radiation having average wavelength in three spectral bands is diffracted by the prism 64 as shown. These three spectral bands may comprise, for example, 1, 2, and 4 micrometers. Utilizing a conventional prism 64 it can be seen that the angular spread of the three spectral bands is relatively small. In FIG. 4B a grism 66 in accordance with the present invention is shown. The grism 66 includes a grating 68 and prism 70. The same three spectral bands as in FIG. 4A are now diffracted by the grism 66 using the same diffractive order. In particular, each of the three bands are diffracted into the minus 1 order. That is, the $P_i$'s in equation 4 are all the same. As a result of the combination of the prism and grating, it can be seen that the grism 65 has amplified the angular spread of the three bands as compared to the prism alone. This amplification has many advantages which may be used in a number of ways depending upon the application. For example, this amplification of angular spread may be used to increase the resolution of a spectrometer.

Referring now to FIG. 5, a grism 72 in accordance with a third embodiment of the present invention is shown in the partially-diffracted grism arrangement. Here, the grism 72 which includes grating 74 and prism 76 is similar to that of grism 66 in FIG. 4B except that the zeroth diffractive order is used. Here, all three spectral bands are first dispersed by the prism. Band three is then further diffracted by the grating 74 using the first order. Bands one and two are outside of the grating diffraction envelope. Thus, very little radiation in bands one and two is diffracted into other orders except the zero order. As a consequence, there is no further angular spread for bands one and two.

FIG. 6 shows a third variation in which a grism 78 having a grating 80 and a prism 82 results in an "unequal-diffracted grism, where bands 1, 2 and 3 are diffracted by the grating each using different diffractive orders. This arrangement not only has very good resolving power due to the use of the higher diffraction orders, but also the size of the resulting spectrometer can also be made very compact. It will be appreciated that the three types of grisms shown in FIGS. 4B, 5, and 6 can be designed by using equation 4 and by selection of parameters such as the number of grating lines, and diffractive order for each particular spectral band. It will also be appreciated that if the grating is a blazed grating, then the desired configuration is achieved by manipulating the parameter of the grating equation to achieve the blazed condition for the desired bands. It should also be noted that to further enhance the dynamic range of a grism spectrometer, the prism used may be replaced by a compound prism consisting of several prisms with different types of materials and proper prism angles. Thus, by judiciously selecting the constant A of these prisms, the desired performance can be achieved as defined by equation 4 above.

From the foregoing it can be seen that the present invention permits the distribution of resolving power between the prism and the grating to yield a grism in which the dynamic range of the resolving power is greatly improved. Further, the selection of the proper diffraction orders can result in a further enhancement of the resolving power by adjusting the diffraction efficiency function. Additional adjustments of the efficiency function of the grism can be achieved through the use of various types of gratings including blazed gratings, binary gratings, volume phase gratings, surface relief gratings, or absorption gratings.

Those skilled in the art can appreciate that other advantages can be obtained from the use of this invention and that modification may be made without departing from the true spirit of the invention after studying the specification, drawings and following claims.

What is claimed is:

1. A dispersive optical element having a predetermined dynamic range of resolving power comprising:

a prism having first and second surfaces defining a prism angle and a base opposite the prism angle; and a grating on the first surface of the prism, the grating being adapted to disperse radiation having multiple spectral bands wherein the resolving power of the dispersive optical element is defined by the expression:

$$\frac{\lambda}{\Delta\lambda} = B(A_2\lambda^{-3} + A_3\lambda^{-5} + A_4\lambda + A_5\lambda^3 + \ldots) * \sum_{i=1}^{k} P_i m$$

where $\lambda$ is the wavelength of light, $\overline{\lambda}$ is the average wavelength of a spectral band of light, B is the prism base width, $\overline{A_i}$'s are the constants used to describe the slope of the index of refraction as a function of wavelength, $P_i$ is the diffractive order of the i'th spectral band of the grating, k is the total number of spectral bands involved, and m is the number of lines in the grating wherein $P_i$ is selected to provide a predetermined diffractive order for each spectral band to thereby provide the predetermined dynamic range of resolving power.

2. The dispersive optical element of claim 1 wherein the grating is a reflective grating.

3. The dispersive optical element of claim 1 wherein the grating is a blazed grating.

4. The dispersive optical element of claim 1 wherein the grating is a binary optical grating.

5. The dispersive optical element of claim 1 wherein the grating is a volume hologram.

6. The dispersive optical element of claim 1 wherein the grating is a surface relief hologram.

7. The dispersive optical element of claim 1 wherein the grating is an absorption grating.

8. The dispersive optical element of claim 1 wherein the prism is a compound prism.

9. The dispersive optical element of claim 1 wherein said multiple spectral bands comprise first, second, and third spectral bands and $P_i$ is selected to provide the same diffractive order for said first, second, and third spectral bands to thereby amplify the angular spread of the diffraction by the prism.

10. The dispersive optical element of claim 1 wherein said multiple spectral bands comprise first, second, and third spectral bands and $P_i$ is selected to provide a first diffractive order for said first and second spectral bands and a second diffractive order for said third spectral band.

11. The dispersive optical element of claim 1 wherein said multiple spectral bands comprise first, second, and third spectral bands and $P_i$ is selected to provide a first diffractive order for said first spectral band, a second diffractive order for said second spectral band, and a third diffractive order for said third spectral band.

12. A spectrometer comprising:

(a) light entrance means;

(b) collimating optical means for collimating light entering said spectrometer through said light entrance means;

(c) a dispersive optical element comprising:

(1) a prism having first and second surfaces defining a prism angle and a base opposite the prism angle; and (2) a grating on the first surface of the prism, the grating being adapted to disperse radiation having multiple spectral bands wherein the resolving power of the dispersive optical element is defined by the expression:

$$\frac{\lambda}{\Delta\lambda} = B(A_2\lambda^{-3} + A_3\lambda^{-5} + A_4\lambda + A_5\lambda^3 + \ldots) * \sum_{i=1}^{k} P_i m$$

where $\lambda$ is the wavelength of light, $\overline{\lambda}$ is the average wavelength of a spectral band of light, B is the prism base width, $\overline{A_i}$'s are the constants used to describe the slope of the index of refraction as a function of wavelength, $P_i$ is the diffractive order of the i'th spectral band of the grating, k is the total number of spectral bands involved, and m is the number of lines in the grating wherein $P_i$ is selected to provide a predetermined diffractive order for each spectral band to thereby provide a predetermined dynamic range of resolving power; and (d) imaging optical means for focusing the light dispersed by the dispersive optical element into a spectrum.

* * * * *